United States Patent
Monnier et al.

(10) Patent No.: US 10,129,565 B2
(45) Date of Patent: Nov. 13, 2018

(54) METHOD FOR PROCESSING HIGH DYNAMIC RANGE VIDEO IN ORDER TO IMPROVE PERCEIVED VISUAL QUALITY OF ENCODED CONTENT

(71) Applicants: Mathieu Monnier, Paris (FR); Nicolas Ollivier, Courbevoie (FR)

(72) Inventors: Mathieu Monnier, Paris (FR); Nicolas Ollivier, Courbevoie (FR)

( * ) Notice: Subject to any disclaimer, the term of this patent is extended or adjusted under 35 U.S.C. 154(b) by 0 days.

(21) Appl. No.: 15/046,762

(22) Filed: Feb. 18, 2016

(65) Prior Publication Data

US 2017/0244980 A1 Aug. 24, 2017

(51) Int. Cl.
*H04N 19/593* (2014.01)
*H04N 19/86* (2014.01)

(52) U.S. Cl.
CPC ........... *H04N 19/593* (2014.11); *H04N 19/86* (2014.11)

(58) Field of Classification Search
CPC .............................. H04N 19/593; H04N 19/86
USPC ..................................... 375/240.03
See application file for complete search history.

(56) References Cited

U.S. PATENT DOCUMENTS

2015/0341675 A1* 11/2015 Su .................. H04N 19/117
375/240.15

* cited by examiner

*Primary Examiner* — Nguyen Truong (57) ABSTRACT

A method for processing High Dynamic Range (HDR) video in order to improve the perceived visual quality of encoded content. An encoder receives an original image, wherein a contrast analysis is performed on said original image in order to highlight potential problematic areas. The original image is reduced to a decreased bit depth image in order to compute a predicted image, wherein the predicted image is then magnified to an increased bit depth image. A residual image is then computed from the original image and the increased bit depth image, and the residual image is transformed into a frequency signal. Quantized coefficients determined through the contrast analysis are then applied to the frequency signal to produce a reduced frequency signal. The encoder then inserts high-frequency components into the reduced frequency signal before encoding a compressed image from the reduced frequency image and the predicted image.

10 Claims, 7 Drawing Sheets

METHOD FOR PROCESSING HIGH DYNAMIC RANGE VIDEO IN ORDER TO IMPROVE PERCEIVED VISUAL QUALITY OF ENCODED CONTENT

FIELD OF THE INVENTION

The present invention relates generally to the processing and encoding of video data in High Dynamic Range (HDR). More specifically, the present invention is a method to improve the visual quality of HDR video signal by avoiding artifact generation, while maintaining a reasonable bit rate.

BACKGROUND OF THE INVENTION

In High Dynamic Range (HDR) video, contrast steps between consecutive coded levels are generally increased in comparison to Standard Dynamic Range (SDR) video because a larger range of luminance has to be coded with nearly the same number of quantized levels. Resultantly, this may produce some visual artifacts such as contouring or banding, especially in areas showing a low-contrast gradient. These visual artifacts may be avoided by adding some noise in the problematic areas so as to emulate a smoother video signal; dithering being one of the most common methods used to generate such noise by randomizing the quantization error. However, the current video compression algorithms implemented by common, standard codecs are unable to preserve such a noisy signal unless the bit rate is increased far beyond the admissible limits of common use cases.

Therefore it is the object of the present invention to introduce a method for processing HDR video in order to improve the perceived visual quality of encoded content. The present invention proposes to use an encoder to compute a residual image at the same, full bit depth as an original image that is to be compressed, as opposed to computing the residual image at a reduced bit depth. Furthermore, a contrast analysis is performed on the original image in order to detect potential problematic areas when compressing the original image. The contrast analysis is utilized to compute a plurality of quantizers that is utilized to allocate more bandwidth to the potential problematic areas when forming a quantized image. The encoder inserts high frequency components into the quantized image in order to preserve accuracy when the compressed image is decoded. applied to the frequency signal in order to produce a quantized image. The plurality of quantized coefficients is applied to a plurality of frequency components of the frequency signal in order to produce a reduced frequency signal (a quantized image). The encoder then inserts high frequency components into the reduced frequency signal, wherein a compressed image is encoded using the reduced frequency signal and the predicted image.

DETAIL DESCRIPTIONS OF THE INVENTION

All illustrations of the drawings are for the purpose of describing selected versions of the present invention and are not intended to limit the scope of the present invention.

The present invention is a method for processing High Dynamic Range (HDR) video in order to improve the perceived visual quality of encoded content. The present invention aims to improve the visual quality of a compressed HDR video signal by avoiding visual artifacts, such as contouring and banding, while maintaining a reasonable bit rate. While a typical encoder receives an image at reduced bit depth, the present invention proposes to supply an encoder with an original image at normal bit depth. Receiving the original image at normal bit depth allows the encoder to perform a contrast analysis on the original image in order to identify potential problematic areas where visual artifacts may be generated.

The goal of the contrast analysis is to control the forthcoming frequency quantization process in order to allocate more bandwidth to the potential problematic areas. The encoder receives the original image and executes the contrast analysis on the original image in order to generate a low-contrast map, wherein the low-contrast map identifies the potential problematic areas. In reference to FIG. 6, the contrast analysis depends on a specific electro-optical transfer function (EOTF) (Step K), as the effect of luminance quantization may differ from one transfer function to another at a given luminance level. The encoder receives a function selection for the specific EOTF, wherein the encoder then executes the contrast analysis of the original image according to the specific EOTF (Step L).

A digitization method, defined by both an EOTF and a bit depth, is first chosen by a user. The specific EOTF is selected from a plurality of EOTFs, wherein the specific EOTF defines a mean local luminance value that is used in performing the contrast analysis on the original image. The desired bit depth is then chosen for the specific EOTF in order to define the digitization method. Typically, visual artifacts are less visible at higher bit depths, however, due to regulations and adopted standards, a lower bit depth may be used. In the preferred embodiment of the present invention, Barten's model of the contrast sensitivity of the human eye is referenced to check whether the digitization method chosen by the user is suitable for HDR video.

In one embodiment of the present invention, the contrast analysis is performed by individually inspecting each of a plurality of pixels of the original image. In reference to FIG. 7, the encoder evaluates a local luminance gradient modulus for each of the plurality of pixels in order to identify areas where banding and contouring artifacts may appear (Step Q). The local luminance gradient modulus may be evaluated using a convolution matrix, such as the Sobel operator. To determine the local luminance gradient modulus for each of the plurality of pixels in such a case, a n×n block of pixels is centered on each of the plurality of pixels, wherein the size of the n×n block of pixels is equal to the size of the convolution matrix. The convolution matrix is then applied to the n×n block of pixels for each of the plurality of pixels in order to calculate the local luminance gradient modulus.

Figure 7:
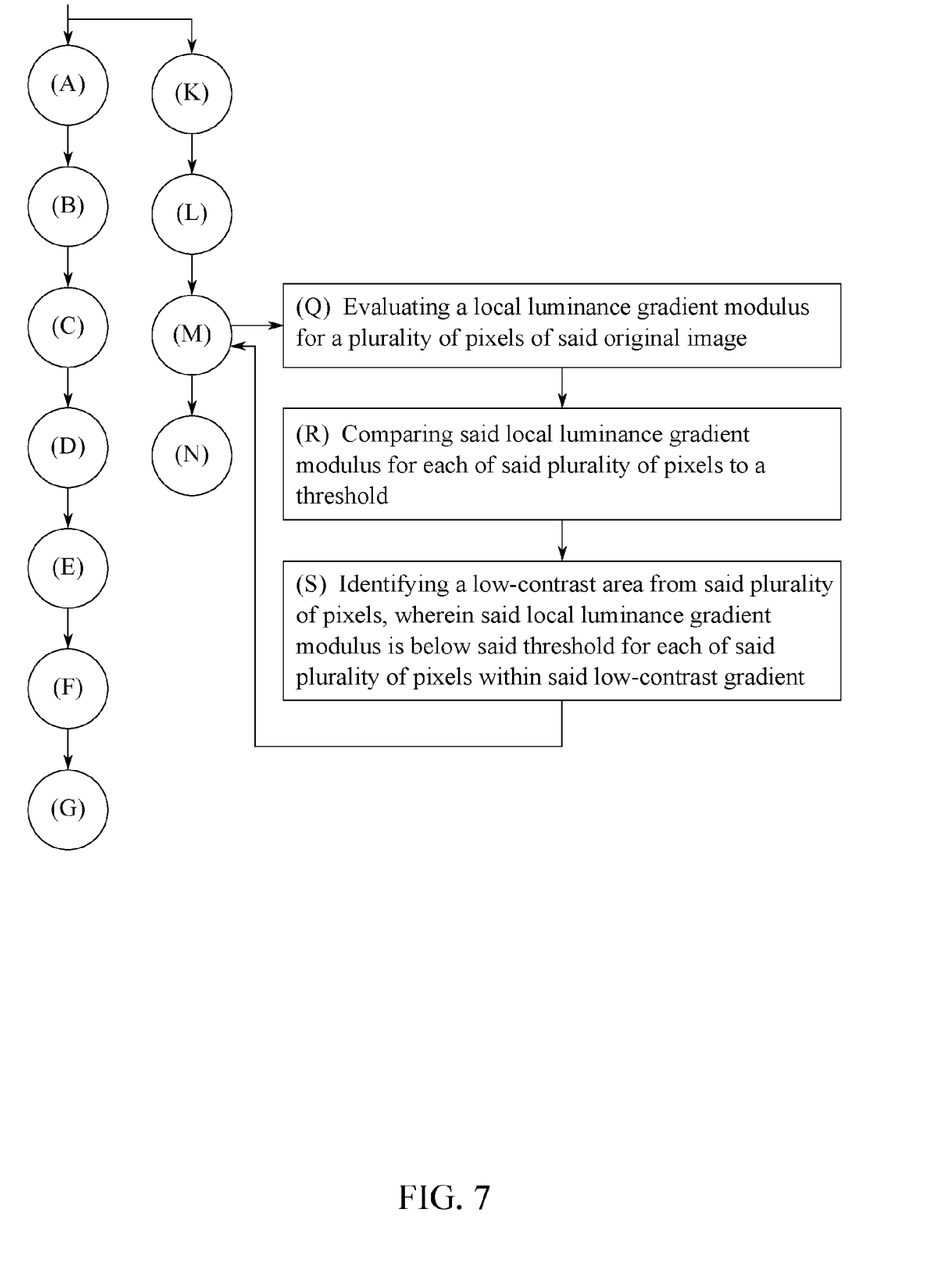
FIG. 7 is a flowchart thereof, depicting steps for generating the low-contrast map used to determine the plurality of quantizers.

In further reference to FIG. 7, once the local luminance gradient modulus has been evaluated for each of the plurality of pixels, the local luminance gradient modulus for each of the plurality of pixels is compared to a threshold (Step R). The threshold depends on the mean local luminance value, wherein the mean local luminance value is determined according to the specific EOTF. The threshold is a percentage of the mean local luminance value and determines a minimum value for assessing the local luminance gradient modulus of each of the plurality of pixels. By comparing the local luminance gradient modulus to the threshold for each of the plurality of pixels, the encoder is able to identify a low-contrast area from the plurality of pixels, wherein the local luminance gradient modulus is below the threshold for each of the plurality of pixels within the low-contrast area (Step S).

The low-contrast area indicates a region where banding and contouring artifacts may appear, but is not necessarily problematic depending on the size of the low-contrast area. The low-contrast area includes a number of adjacent low-gradient pixels from the plurality of pixels, as defined by the threshold, that is evaluated to determine whether or not the low-contrast area is problematic. In order to analyze the low-contrast area, the number of adjacent low-gradient pixels is compared to a predetermined number of pixels; the predetermined number of pixels setting a minimum number of adjacent pixels needed for the low-contrast area to be considered problematic. If the number of adjacent low-gradient pixels is greater than the predetermined number of pixels, then the low-contrast area is flagged as a problematic area and added to the low-contrast map.

Figure 6:
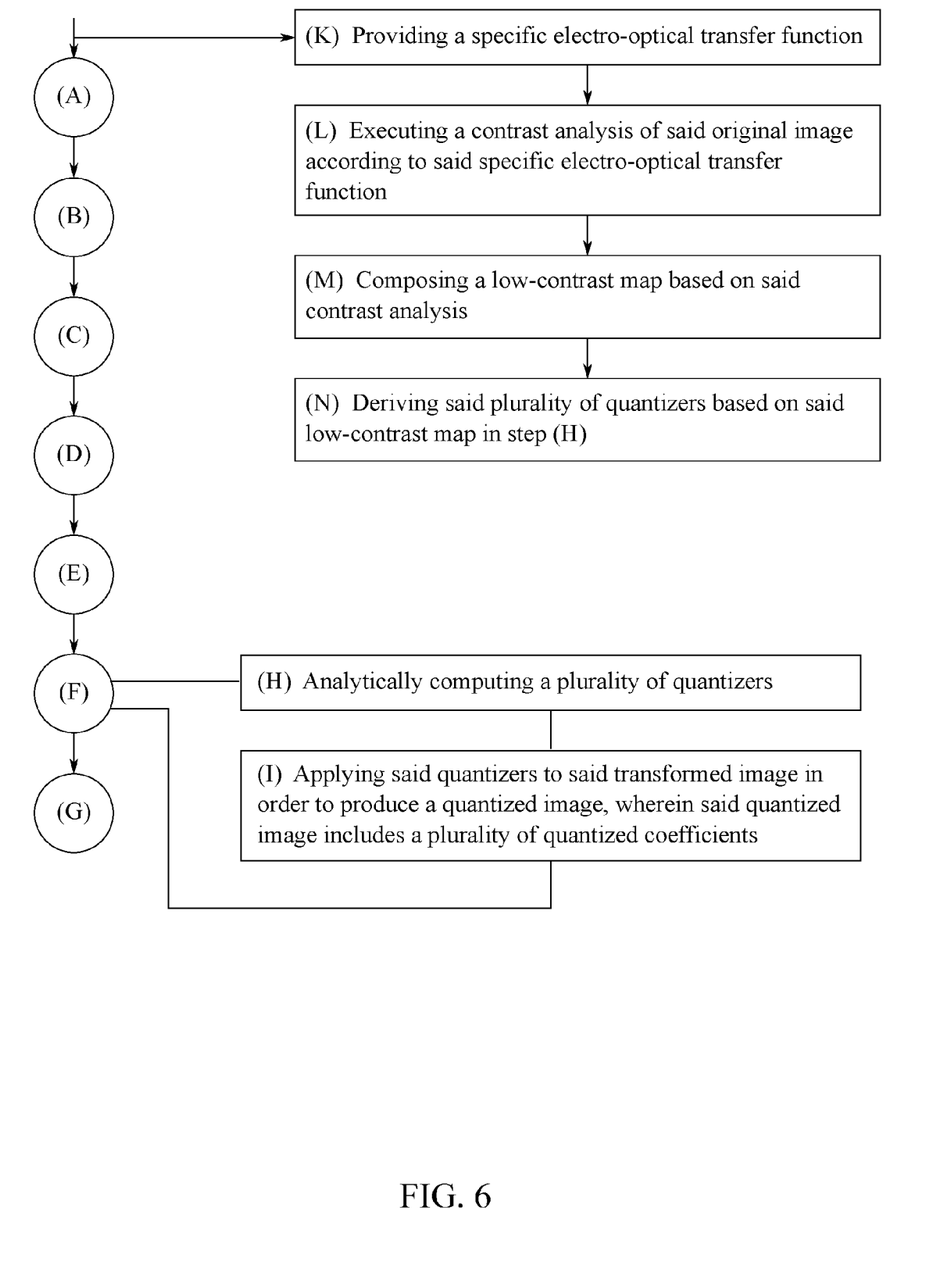
FIG. 6 is a flowchart thereof, depicting steps for performing a contrast analysis that is used to determine a plurality of quantizers used to generate the quantized image.

In reference to FIG. 6, the encoder composes the low-contrast based on the contrast analysis (Step M), wherein the low-contrast map is a compilation of low-contrast areas discovered through the contrast analysis of the original image. The low-contrast map highlights potential problematic areas due to a large number of adjacent low-gradient pixels, while the process of evaluating each of low-contrast areas eliminates isolated low-gradient pixels from being included in the low-contrast map. Once the low-contrast map has been generated, the encoder can utilize the low-contrast map to determine whether a block has to be promoted for more bandwidth in the forthcoming frequency quantization process. In a typical encoding process, potentially problematic areas are not identified and bandwidth is equally allocated during the scaling and quantization process. By identifying potential problematic areas, the low-contrast map allows the encoder to allocate more bandwidth, if necessary, to said problematic areas.

In some embodiments of the present invention, it is also possible for the original image to be modified before the contrast analysis is performed in an effort to improve the efficiency of the contrast analysis. For example, a denoising filter can be applied to the original image prior to performing the contrast analysis. The denoising filter is used to remove random or white noise from the HDR video signal that may have been introduced from the machinery used to record the video, or from the pre-processing of the HDR video signal.

In addition to generating the low-contrast map, the original image is also used to compute a predicted image. In reference to FIG. 2, the bit depth of the original image is first reduced, wherein the original image is reduced to a decreased bit-depth image (Step A). When using a denoising filter, the decreased bit-depth image can be computed by simply rounding the reduced pixel values of the original image to the nearest integer. Any known bit depth reduction techniques can be used to reduce the original image to the decreased bit-depth image. However, no dithering algorithm is performed when computing the decreased bit-depth image, which provides two main advantages: speeding up the encoding process by removing what is often a heavy computational step, and freeing the original image that is to be encoded of any dithering noise, which is most of the time very hard to compress without generating any visual artifacts without sorely increasing the bit rate.

Figure 2:
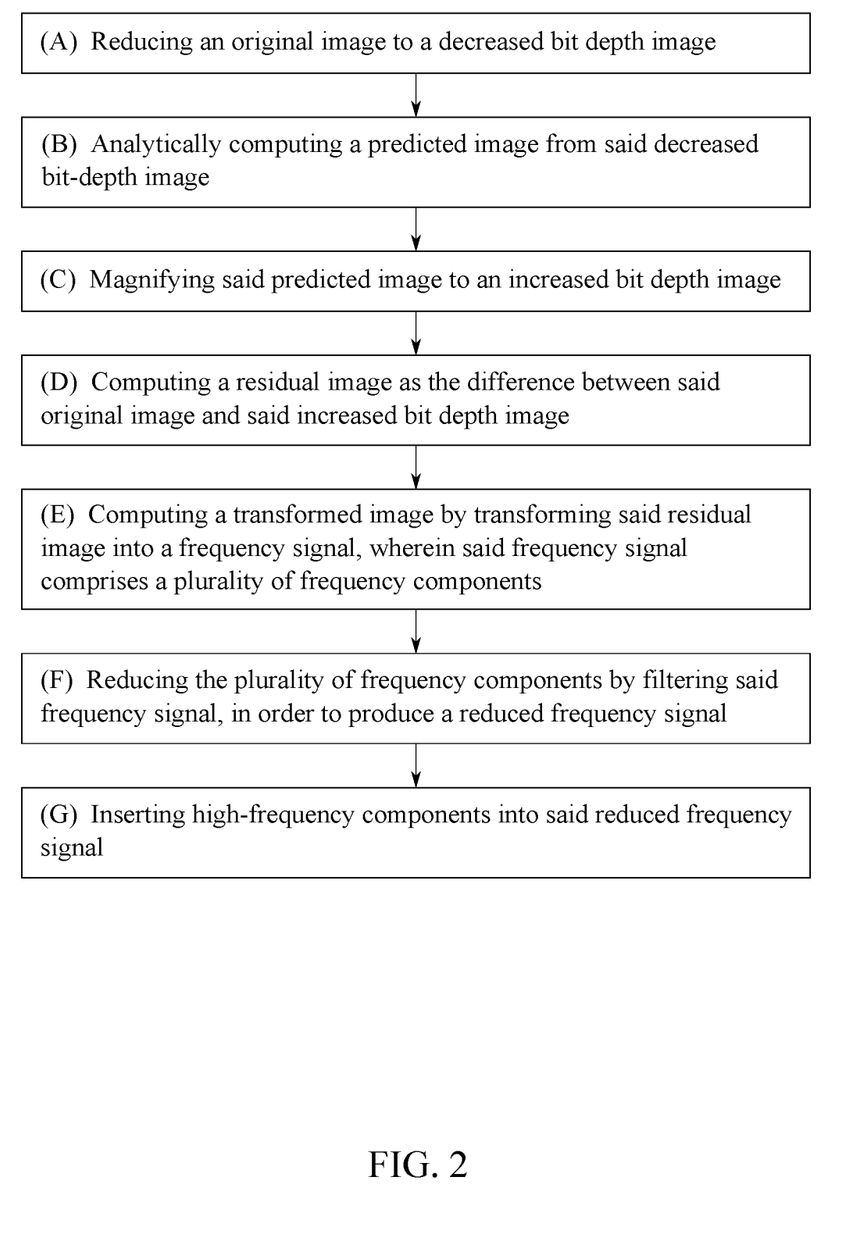
FIG. 2 is a flowchart depicting the steps for processing High Dynamic Range video in order to encode a compressed image.
Figure 3:
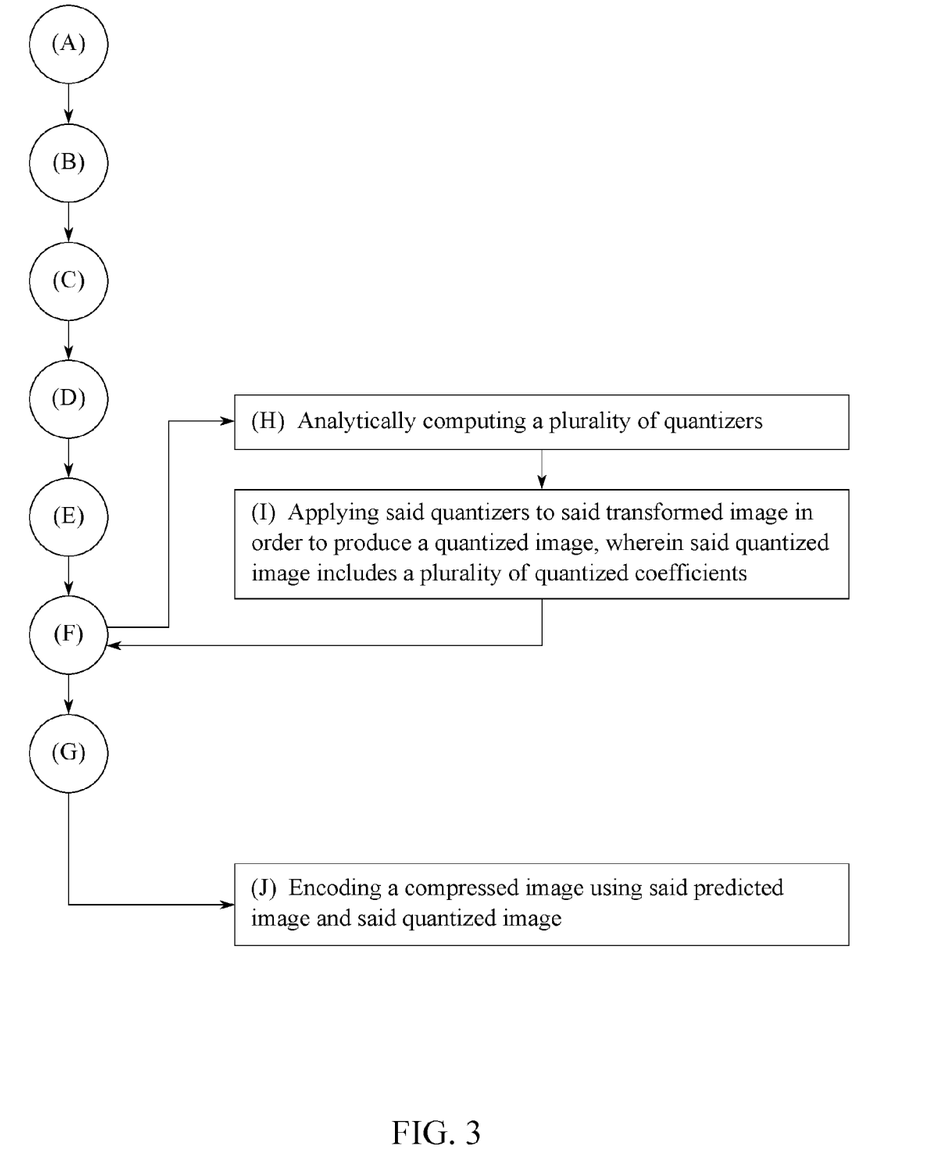
FIG. 3 is a flowchart thereof, depicting steps for producing the reduced frequency signal and encoding the compressed image.
Figure 4:
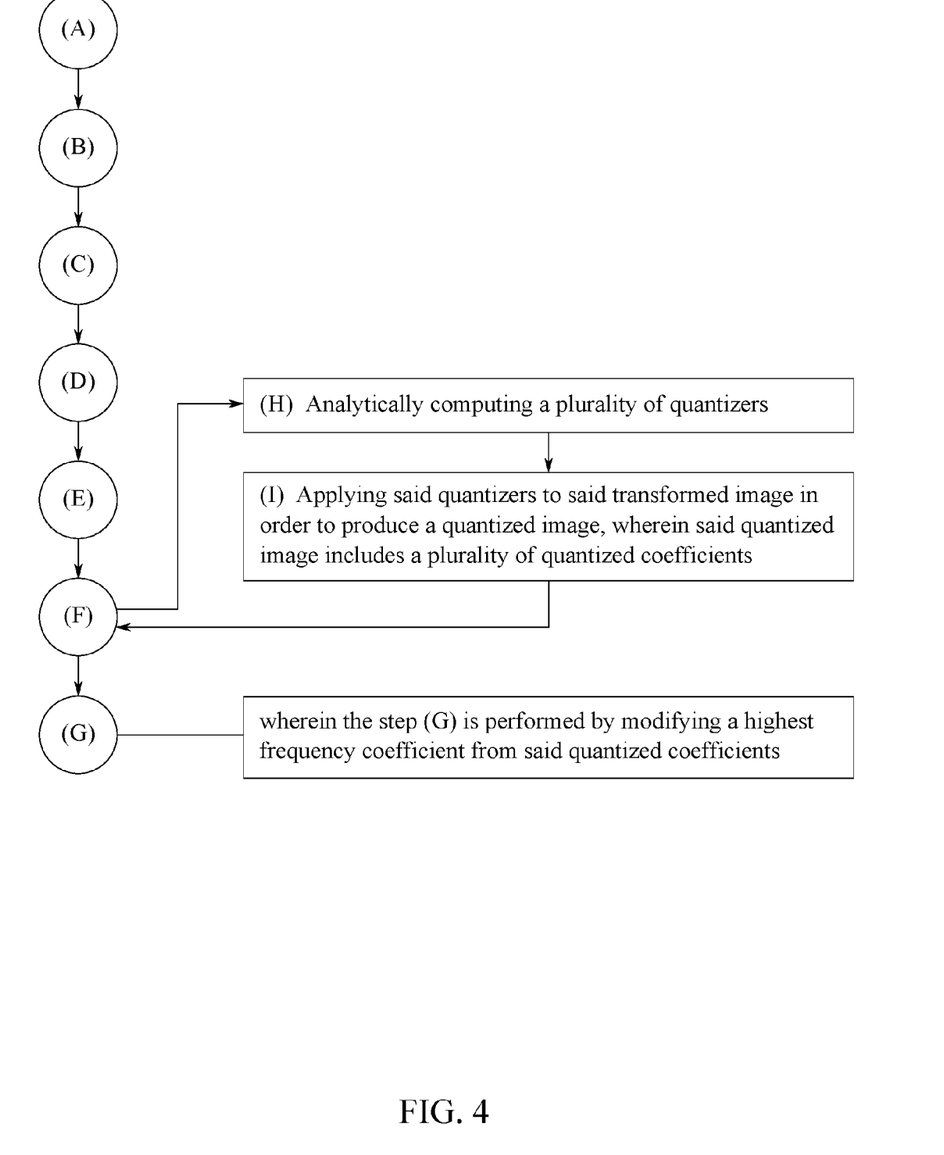
FIG. 4 is a flowchart thereof, depicting a method for inserting high-frequency components into the reduced frequency signal.
Figure 5:
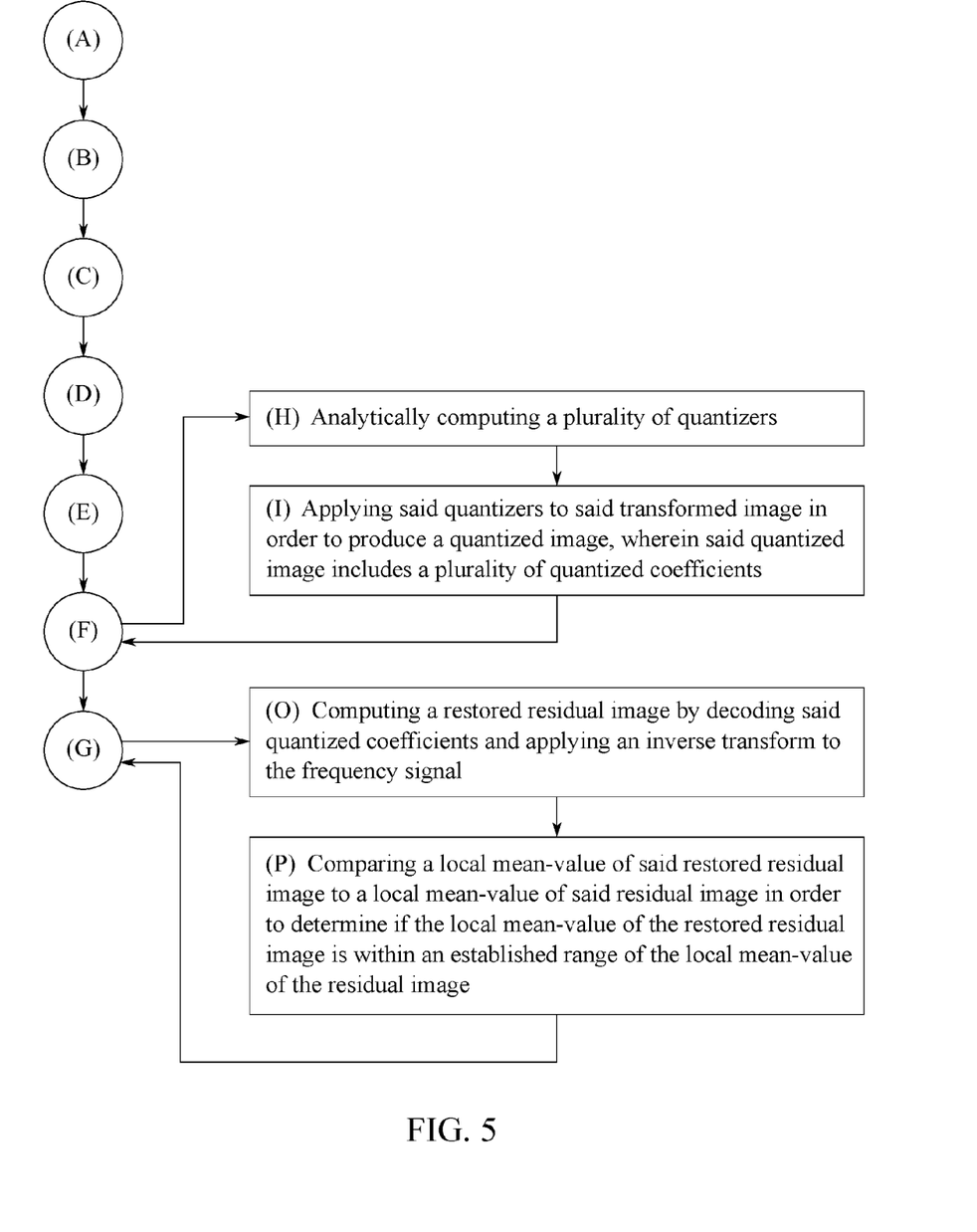
FIG. 5 is a flowchart thereof, depicting steps for determining a satisfactory value to which the highest frequency coefficient is set.

In further reference to FIG. 2, once the encoder has computed the decreased bit-depth image, the encoder analytically computes the predicted image from the decreased bit-depth image (Step B). The predicted image is computed by applying an image prediction method, such as temporal prediction or intra prediction, to the decreased bit-depth image. The present invention can utilize a single image prediction method, or a combination of image prediction methods. In some embodiments of the present invention, the low-contrast map generated through the contrast analysis may be used in computing the predicted image. In order to avoid any distortion due to error accumulation, it may be better to avoid using any temporal prediction where the potentially problematic areas have been indicated by the low-contrast map. Therefore, intra prediction methods may instead be favored for computing the predicted image.

Further referencing FIG. 2, the bit depth of the predicted image is then increased, wherein the predicted image is magnified to an increased bit-depth image by the encoder (Step C). The bit depth of the predicted image is increased such that the bit depth of the increased bit-depth image matches the bit depth of the original image. The increased bit-depth image can be generated by simply performing a bit shift of the predicted image in order to restore the bit depth of the original image. The increased bit-depth image is then used to compute a residual image. In a typical encoding process, the encoder would receive the decreased bit-depth image as opposed to the original image, wherein the residual image would be computed using the decreased bit-depth image and the predicted image. Because the encoder is supplied with the original image at full bit depth in the present invention, the encoder can compute the residual image using the original image at full bit depth.

In yet further reference to FIG. 2, the residual image is computed by the encoder as the difference between the original image and the increased bit-depth image (Step D), wherein the residual image contains all the details that could not be predicted. As a result of computing the residual image from the increased bit-depth image and the original image at full bit depth, no details from the original image are lost before the transform or quantization of the residual image, especially low-contrast gradients. Once the encoder has computed the residual image, the encoder computes a transformed image by transforming the residual image into a frequency signal, wherein the frequency signal comprises a plurality of frequency components (Step E).

The residual image is transformed into the frequency signal by applying a selected transform to the residual image, wherein the transformed image is defined by the plurality of frequency components. The selected transform is chosen by the user and can be any transform, such as a discrete cosine transform or discrete Fourier transform. The residual image is first divided into a plurality of discrete blocks, wherein each of the plurality of discrete blocks is a matrix of pixels. The selected transform is then applied to each of the plurality of discrete blocks in order to determine the plurality of frequency components, both horizontally and vertically, within the matrix of pixels for each of the plurality of discrete blocks. Resultantly, the transformed image consists of the plurality of frequency components divided into the plurality of discrete blocks.

In reference to FIG. 2, once the transformed image has been generated, the encoder computes a reduced frequency signal. In order to produce the reduced frequency signal, the encoder reduces the plurality of frequency components by filtering the frequency signal (Step F). More specifically, the encoder applies a plurality of quantizers to the transformed image in order to produce a quantized image, wherein the quantized image includes a plurality of quantized coefficients (Step I), as depicted in FIG. 3-6. The quantized image is generated in an effort to provide more resolution to the more perceivable frequency components from the plurality of frequency components as compared to the less perceivable components from the plurality of frequency components. Additionally, the plurality of quantizers is applied to the plurality of frequency components in an effort to reduce as many of the plurality of frequency components as possible to zero, as such frequency components can be coded the most efficiently.

In reference to FIG. 2 and FIG. 6, in order to produce the reduced frequency signal, first, the encoder analytically computes the plurality of quantizers (Step H); the plurality of quantizers being derived based on the low-contrast map (Step N). The plurality of quantizers corresponds to the plurality of discrete blocks, wherein a unique quantizer from the plurality of quantizers is applied to each of the plurality of discrete blocks. The low-contrast map is utilized to determine whether any of the plurality of discrete blocks need to be promoted for more bandwidth. Once the required bandwidth is determined for each of the plurality of discrete blocks, the unique quantizer for each of the plurality of discrete blocks is correspondingly determined. Thus, the low-contrast map is utilized to determine the unique quantizer that is applied to each of the plurality of discrete blocks.

To compute the quantized image, the transformed image is divided into the plurality of discrete blocks determined when computing the transformed image from the residual image. The plurality of quantized coefficients is computed by applying the plurality of quantizers to the plurality of frequency components. The unique quantizer is applied to each of the plurality of discrete blocks, wherein the plurality of frequency components for the matrix of pixels of each of the plurality of discrete blocks is transformed into the plurality of quantized coefficients. Thus, the plurality of quantized coefficients computed for the quantized image is resultant of the low-contrast map. The result of applying the unique quantizer to each of the plurality of discrete blocks, is the transformation of the frequency components into the quantized coefficients for the quantized image.

Given that the unique quantizer is small enough when suggested by the contrast analysis, the plurality of quantized coefficients will be sufficiently accurate to transmit even a low-contrast gradient that would normally require some intermediate decimal pixel values. However, when reversing the quantization and transformation steps, a standard decoder would lose this accuracy because of the final rounding of a restored residual image. Indeed the restored residual image is always added to the predicted image at the encoding, hence reduced bit depth. In reference to FIG. 2, to prevent the loss of accuracy from occurring when decoding, the encoder inserts high-frequency components into the reduced frequency signal (Step G).

The insertion of the high-frequency components is intended to produce a high-frequency rounding noise, which makes the rounded residual emulate the missing intermediate pixel levels while keeping the same average value. To generate the most adapted rounding noise several spatial high frequencies may be inserted into the plurality of quantized coefficients. However, in reference to FIG. 4, to limit the impact on bit rate from adding some more frequencies to the already non-null quantized coefficients from the plurality of quantized coefficients, only a highest frequency coefficient from the plurality of quantized coefficients could be modified in Step G as a compromise; the highest frequency coefficient being the most bottom-right value in the two dimensional frequency domain of the plurality of quantized coefficients.

The encoder can tune the value of the highest frequency coefficient until sufficient rounding noise is inserted in order to emulate the low-contrast gradient. One possible approach to modifying the highest frequency coefficient is to implement an iterative process that includes inverting the quantization and the transform, as a standard decoder would, for each of a plurality of considered values of the highest frequency coefficient. In reference to FIG. 5, for each of the plurality of considered values, the encoder computes the restored residual image by decoding the plurality of quantized coefficients and applying an inverse transform to the frequency signal (Step O).

Resultantly, the encoder determines a local mean-value for the restored residual image at each of the plurality of considered values. In further reference to FIG. 5, the encoder then compares the local-mean value to a local-mean value of said residual image for each of the plurality of considered values, in order to determine if the local-mean value of the restored residual image is within an established range of the local mean-value of the residual image (Step P). Hence, the encoder decodes the highest frequency coefficient for the plurality of considered values in order to determine a satisfactory value; the satisfactory value providing sufficient rounding noise as to emulate the low-contrast gradient. The satisfactory value may be determined as the local mean-value of the restored residual image that is first discovered to be within the established range of the local mean-value of the residual image, as the local mean-value of the restored residual image that is closest to the local-mean-value of the residual image, or determined using any other factors.

Once the high frequency components have been added to the reduced frequency signal, a compressed image can be generated for the original image. In reference to FIG. 3, the encoder encodes the compressed image using the predicted image and the quantized image in the form of an output bit stream (Step J), wherein the output bit stream is a compressed video stream that can be decoded using any standard video decoder. Preferably, the compressed image is encoded according to the International Telecommunications Union Telecommunication Standardizations Sector (ITU-T) H.265 standard or a hybrid video codec. However, it is possible for the compressed image to be encoded using any other standards such as the Advanced Video Coding format.

Figure 1:
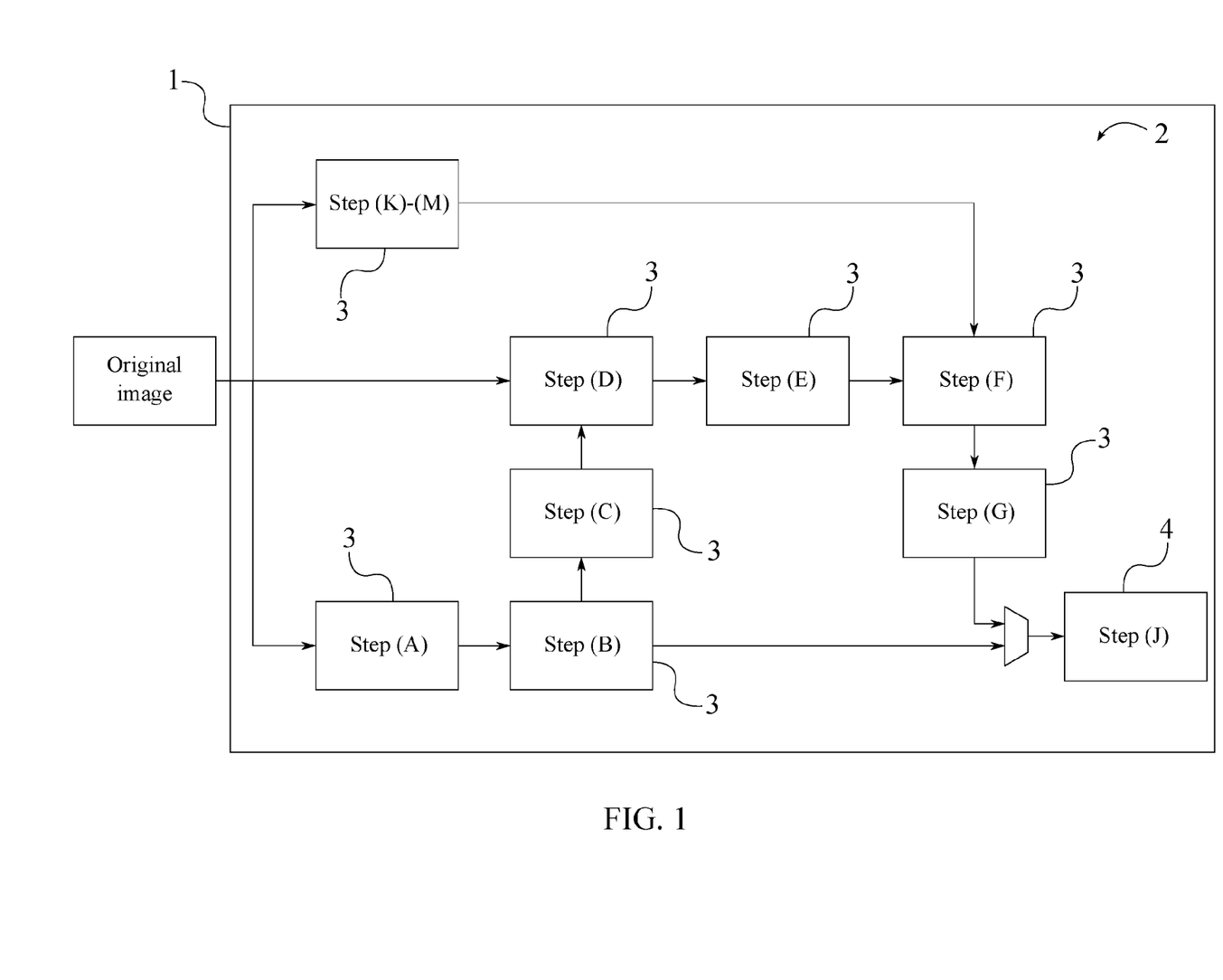
FIG. 1 is a diagram depicting the device configured for processing a sequence of high dynamic range images; the device having a plurality of modules for implementing the steps of the present invention.

In reference to FIG. 1, in some embodiments of the present invention, a device 1 configured for processing a sequence of high dynamic range images is utilized for executing the present invention. The device 1 comprises a plurality of modules 2 for implementing the steps of the present invention; modules 3 for implementing the Steps A-G and a module 4 for implementing the Step J. The device 1 may be a dedicated hardware chip, a plurality of chips, or any other similar device that can be configured to process the steps of the present invention as intended. Each of the modules 2 is uniquely configured to execute the assigned tasks, wherein each of the modules 2 may be configured as an individual piece of hardware or multiple pieces of hardware.

Although the invention has been explained in relation to its preferred embodiment, it is to be understood that many other possible modifications and variations can be made without departing from the spirit and scope of the invention as hereinafter claimed.

What is claimed is:

1. A method for processing a sequence of high dynamic range images, the method comprises the steps of:
    (A) reducing an original image to a decreased bit-depth image;
    (B) analytically computing a predicted image from said decreased bit-depth image;
    (C) magnifying said predicted image to an increased bit-depth image;
    (D) computing a residual image as the difference between said original image and said increased bit-depth image;
    (E) computing a transformed image by transforming said residual image into a frequency signal, wherein said frequency signal comprises a plurality of frequency components;
    (F) reducing the plurality of frequency components by filtering said frequency signal, in order to produce a reduced frequency signal; and
    (G) inserting high-frequency components into said reduced frequency signal.

2. The method for processing a sequence of high dynamic range images as claimed in claim 1, wherein the step (F) comprises the sub-steps of:
    (H) analytically computing a plurality of quantizers; and
    (I) applying said quantizers to said transformed image in order to produce a quantized image, wherein said quantized image includes a plurality of quantized coefficients.

3. The method for processing a sequence of high dynamic range images as claimed in claim 2, wherein the method further comprises the step of:
    (J) encoding a compressed image using said predicted image and said quantized image.

4. The method for processing a sequence of high dynamic range images as claimed in claim 2, wherein the method further comprises the steps of:
    (K) providing a specific electro-optical transfer function;
    (L) executing a contrast analysis of said original image according to said specific electro-optical transfer function;
    (M) composing a low-contrast map based on said contrast analysis; and
    (N) deriving said plurality of quantizers based on said low-contrast map, in step (H).

5. The method for processing a sequence of high dynamic range images as claimed in claim 2, wherein the step (G) is performed by modifying a highest frequency coefficient from said quantized coefficients.

6. The method for processing a sequence of high dynamic range images as claimed in claim 2, wherein the step (G) comprises the sub-steps of:
    (O) computing a restored residual image by decoding said quantized coefficients and applying an inverse transform to the frequency signal; and
    (P) comparing a local mean-value of said restored residual image to a local mean-value of said residual image in order to determine if the local mean-value of the restored residual image is within an established range of the local mean-value of the residual image.

7. The method for processing a sequence of high dynamic range images as claimed in claim 3, wherein the compressed image is encoded according to a hybrid video codec.

8. The method for processing a sequence of high dynamic range images as claimed in claim 4, wherein the step (M) comprises the sub-steps of:
    (Q) evaluating a local luminance gradient modulus for a plurality of pixels of said original image;
    (R) comparing said local luminance gradient modulus for each of said plurality of pixels to a threshold; and
    (S) identifying a low-contrast area from said plurality of pixels, wherein said local luminance gradient modulus is below said threshold for each of said plurality of pixels within said low-contrast area.

9. The method for processing a sequence of high dynamic range images as claimed in claim 1, the method further comprises:
    executing the steps (A)-(G) on a device configured for processing a sequence of high dynamic range images, wherein the device comprises modules for implementing the steps (A)-(G).

10. The method for processing a sequence of high dynamic range images as claimed in claim 3, the method further comprises:
    executing the step (J) on a device configured for processing a sequence of high dynamic range images, wherein the device comprises a module for implementing the step (J).

* * * * *